Nov. 18, 1941.  G. F. PIEPER  2,263,274
ROTARY DIESEL INTERNAL-COMBUSTION ENGINE
Filed June 6, 1940  4 Sheets-Sheet 1
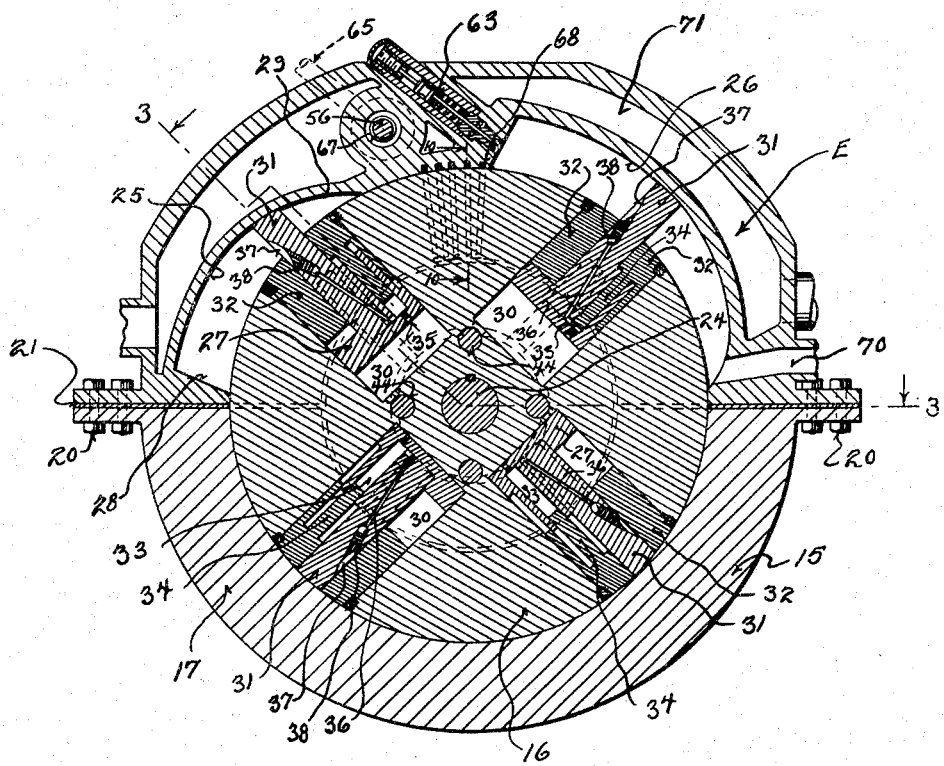
Fig. 1.
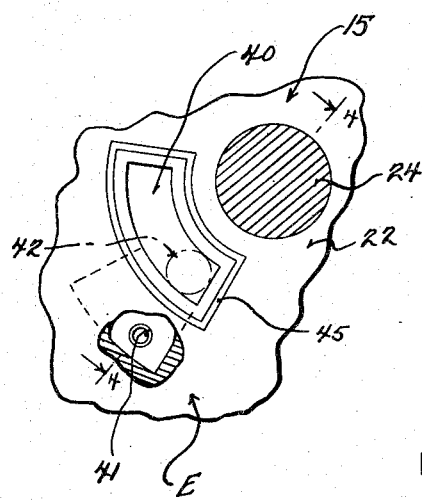
Fig. 5.
Inventor
G. F. Pieper
By 
Attorneys

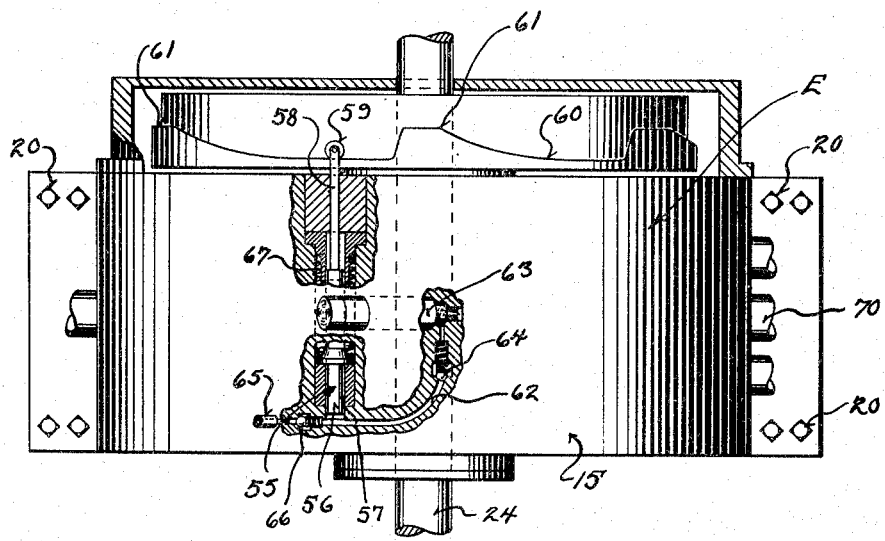
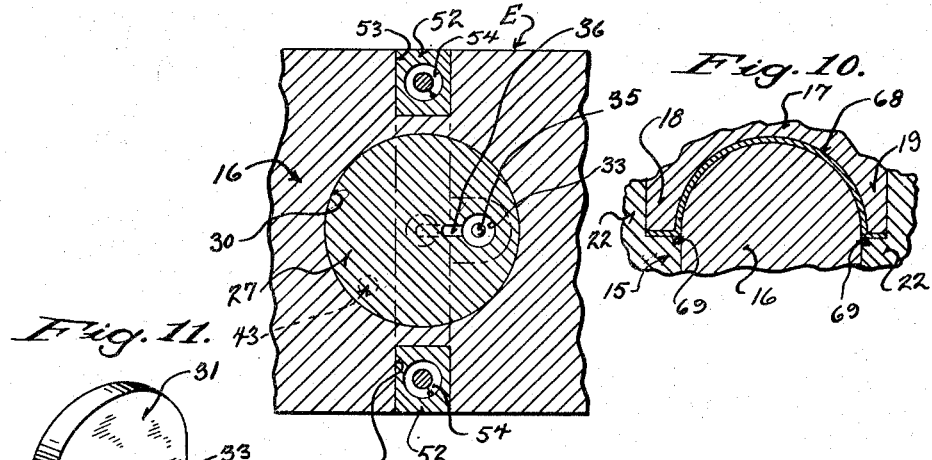
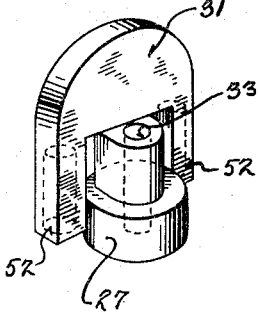
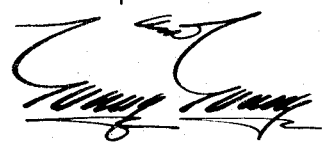

Inventor
G. F. Pieper

By

Attorneys

Nov. 18, 1941.  G. F. PIEPER  2,263,274
ROTARY DIESEL INTERNAL-COMBUSTION ENGINE
Filed June 6, 1940  4 Sheets-Sheet 4
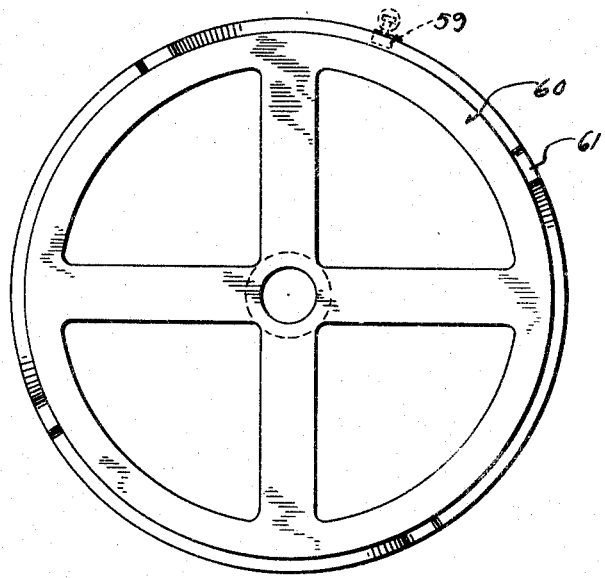
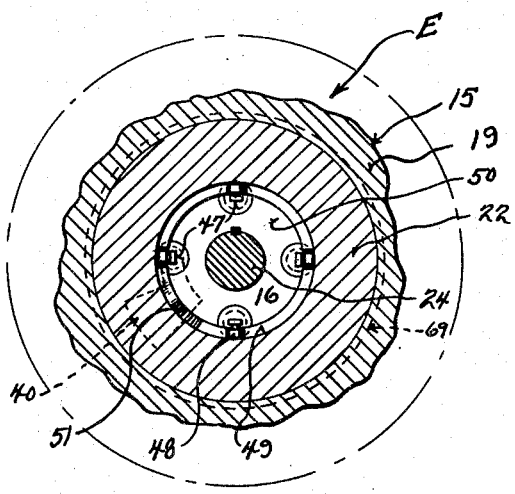
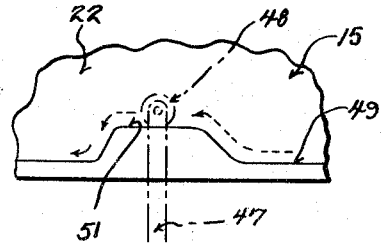
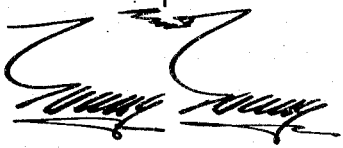

Patented Nov. 18, 1941

2,263,274

UNITED STATES PATENT OFFICE 2,263,274

ROTARY DIESEL INTERNAL-COMBUSTION ENGINE

George F. Pieper, Milwaukee, Wis.

Application June 6, 1940, Serial No. 339,089

2 Claims. (Cl. 123—16)

This invention appertains to motors, and more particularly to rotary internal combustion engines.

One of the primary objects of my invention is to provide a rotary combustion engine of the Diesel type having novel means for highly compressing the air and for introducing atomized fuel under pressure into the compressed air, whereby to bring about the desired firing of the charge and the proper propulsion of the rotor.

Another salient object of my invention is to provide novel means for simultaneously introducing the highly compressed air and the atomized fuel into the combustion chamber, whereby to bring about an effective turbulence of the air and fuel charge and, thus, insure the thorough commingling of the fuel and air to form the fuel mixture for firing.

A further important object of my invention is the provision of novel vanes or blades automatically moved into and out of the rotor, and having novel piston members formed thereon, whereby during the rotation of the rotor the air will be sucked into the rotor and highly compressed and then transferred to the firing chamber, the vanes forming the abutments for the charge during the firing thereof to bring about the operation of the rotor.

A further important object of my invention is the provision of means for subjecting the air to a primary and a secondary compression by the vane-operated pistons, so as to insure the delivery of the air in a highly compressed state to the firing chamber.

A still further object of my invention is the provision of novel means for automatically opening and closing the air inlet valves at the proper times during the operation of the rotor, whereby the air can be effectively sucked into the rotor by the vane-actuated pistons.

A still further object of my invention is the provision of novel means for arranging the fuel pump directly in the stator casing and for automatically actuating the pump during the operation of the rotor, the pump being of such a construction that an exact and metered amount of fuel charge will be sucked into the engine from the fuel line and then forced under compression to the fuel atomizer.

A still further object of my invention is to provide novel means for arranging the various parts of the motor, whereby the motor will be easy to assemble and take apart, and whereby the proper operation of all of the operating parts in the correct timed relation will be had.

With these and other objects in view, the invention consists in the novel construction, arrangement, and formation of parts, as will be hereinafter more specifically described, claimed, and illustrated in the accompanying drawings, in which drawings:

Figure 1 is a central sectional view through my novel rotary Diesel internal combustion engine, taken on the line 1—1 of Figure 3 looking in the direction of the arrows.

Figure 2 is a top plan view of my engine, with parts thereof broken away and in section to illustrate the novel fuel pump and operating mechanism therefor.

Figure 5 is a fragmentary, detail, sectional view taken on the line 5—5 of Figure 4, looking in the direction of the arrows, illustrating the air inlet port formed in the stator.

Figure 6 is an enlarged, fragmentary, detail, sectional view through the rotor, taken on the line 6—6 of Figure 3, looking in the direction of the arrows and illustrates the construction of one of the vane-operated pistons.

Figure 7 is a detail, side, elevational view of the cam wheel for bringing about the proper timed operation of the fuel pump.

Figure 8 is a detail, sectional view taken on the line 8—8 of Figure 3, looking in the direction of the arrows, illustrating the means for bringing about the proper timed operation of the air inlet valves.

Figure 9 is a fragmentary, detail view showing a part of the cam track for bringing about the actuation of the air inlet valves.

Figure 10 is a detail, sectional view taken on the line 10—10 of Figure 1, looking in the direction of the arrows, illustrating the means for properly sealing the rotor and the stator in advance of the firing chamber.

Figure 11 is a detail, perspective view of one of the vanes and piston-operating members.

Figure 3:
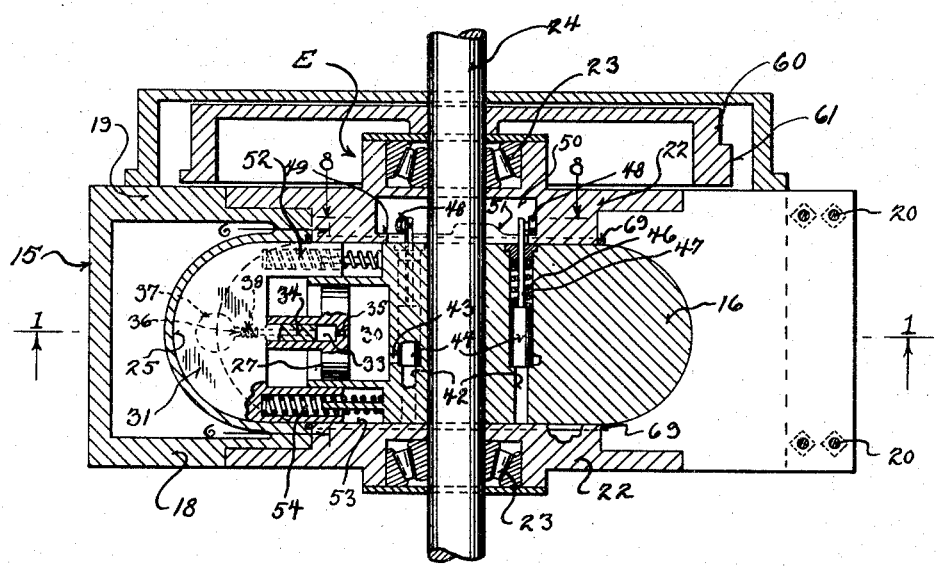
Figure 3 is a sectional view taken at right angles to Figure 2 and on the line 3—3 of Figure 1, looking in the direction of the arrows, illustrating the novel arrangement of the vane and piston.
Figure 4:
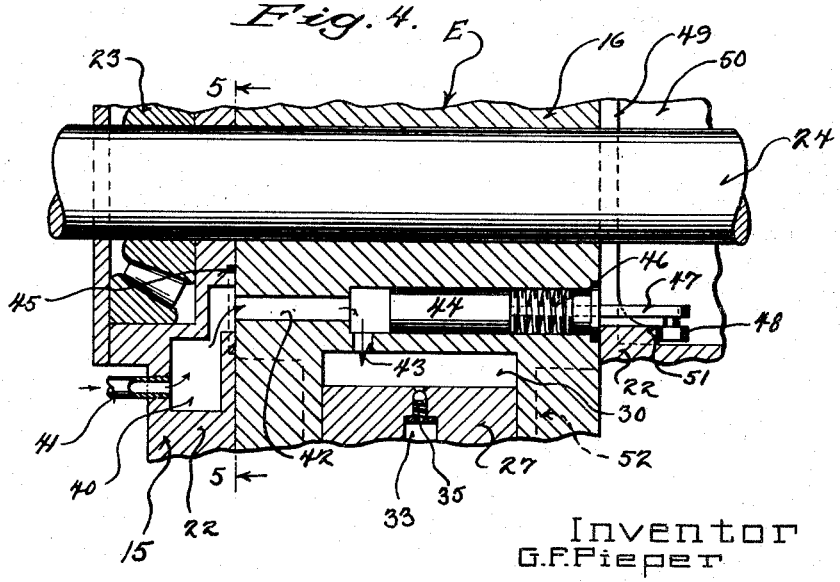
Figure 4 is an enlarged, fragmentary, detail, sectional view taken on the line 4—4 of Figure 5, looking in the direction of the arrows, illustrating the valve-controlled means for the air inlet.

Referring to the drawings in detail, wherein similar reference characters designate corresponding parts throughout the several views, the letter E generally indicates my improved rotary Diesel engine, and the same includes the stator 15 and the rotor 16.

The stator 15 includes the annular side wall 17 and the side plates 18 and 19. The stator is preferably formed in companion half-sections to facilitate the assembling of the engine, and these half-sections can be secured together by bolts 20, and suitable gaskets 21 can be interposed between the sections. The side wall plates 18 and 19 of the stator receive bearing discs 22. These bearing discs 22 at their axial centers carry anti-friction bearings 23 for the propelling shaft 24.

Keyed or otherwise rigidly fastened to the shaft 24 is the rotor 16. This rotor is preferably formed from a single block of metal, whereby to function as a flywheel, and the stator is shaped to conform to the configuration of the rotor. The periphery of the rotor is rounded transversely for snug engagement with the inner surface of the stator, and this helps to overcome compression loss. The inner face of the stator at spaced points is provided with a relatively short chamber 25 and a similar relatively long chamber 26. The relatively long chamber 26 constitutes the firing chamber; while the relatively short chamber 25 operates as means for permitting the desired radial movement of the air compression pistons 27 carried by the rotor. Both of the chambers 25 and 26 have relatively deep inner ends 28 and forward shallow ends 29, and the chamber surfaces connecting these ends are of an arcuate form, and these surfaces constitute guide or cam tracks for operating the air compression pistons 27, as will be later described.

Referring back to the rotor 16, it will be seen that the periphery of the rotor at quarters is bored inwardly to provide radially extending piston cylinder chambers 30, and the compression pistons 27 are slidably mounted in the chambers, and each compression piston is provided with an outwardly extending vane or blade 31, which operates in the stator chambers 25 and 26. The cylinder chambers 30 are closed by removable blocks or heads 32, and these blocks form a guide for the vanes or blades 31. The inner faces of the main air compression pistons 27 have formed directly therein air compression cylinder cavities 33, which receive plunger extensions 34 formed on the blocks or heads, and these plunger extensions 34 ride into and out of the secondary air compression cavities 33 during movement of the main air compression pistons 27.

The entrance of compressed air into the secondary compression cavity 33 is controlled by an inwardly opening spring-pressed check valve 35, and the flow of air from the secondary piston compression cavities is through a passageway 36 formed in each piston, and these passageways open out through the depressed faces 37 of the vanes 31. The flow of air through the passageways 36 is controlled by outwardly opening spring-pressed check valves 38.

Air from the atmosphere is admitted into the primary compression cylinder chambers 30 during the rotation of the rotor through an inlet port 40. This port communicates with the outside air by means of an inlet pipe 41 and opens into the interior of the stator.

Formed within the rotor at the inner end of each primary compression cylinder chamber is the air inlet passageway 42, and these passageways are adapted to temporarily register with the air inlet ports 40 during the movement of the rotor. These passageways 42 communicate with the inner end of the cylinder chambers by ports 43, and these ports are opened and closed in proper timed relation by cylindrical slide valves 44. If preferred, a sealing ring 45 can be placed around the port 40 for sliding engagement with the rotor 16.

The slide valves 44 are normally urged to a closed position by expansion springs 46 coiled about the valve stems 47. The outer ends of the valve stems 47 carry anti-friction rollers 48, which travel over a guide track 49 formed in one wall of a pocket 50 disposed in one side bearing plate 22. The track 49 at the correct point is provided with a lobe 51 adjacent but across from the air inlet port 40. Consequently, during rotation of the rotor and when the passageway 42 registers with the port 40, the slide valve 44 for the adjacent inlet 43 will be opened by the roller 48 and the lobe 51. Consequently, air will be permitted to flow into the cylinder chamber 30.

At this particular time, a vane 31 snaps into the deep end of the short chamber 25, and this creates a suction in its cylinder chamber 30 by its piston 27. The slide valve immediately closes, and the air is then trapped in the primary compression cylinder chamber 30, and this piston is then forced inwardly by the vane 31 riding on the arcuate face of the chamber 25, and the piston 27 will be cammed inwardly and the air will be initially compressed.

When the air reaches a certain pressure sufficient to overcome the tension of the spring check valve 35, then the check valve will be forced off its seat, and at this particular time the plunger extension 34 on the cylinder closure heads or blocks 32 will suck said air into the secondary air compression cylinder cavity 33.

As the rotor moves on, the vane will ride out of the first chamber 25 and then into the second or firing chamber 26, and as soon as the vane reaches the second or firing chamber 26, the vane will move into the deep end of said chamber, causing the air to be recompressed in the cylinder cavity 33 by the plunger extension 34, and when the air is compressed to a point where the same will overcome the tension of the spring of the second valve 38, the highly compressed air will be forced into the firing chamber 26.

The vanes 31 are each provided with guide extensions 52, which are slidably mounted in guide slots 53 formed in the sides of the rotor 16. Relatively heavy expansion springs 54 engage the guides 52 and the inner ends of the walls of the guide slots, and, hence, these springs function to normally urge out the vanes 31 and their main pistons 27.

Located between the stator chambers 25 and 26 is the fuel pump 55, and this fuel pump includes a reciprocating pump piston 56 operating in a pump cylinder 57. The piston 56 is provided with a piston stem 58 carrying an anti-friction roller 59. This roller 59 travels over a cam wheel 60 having lobes or throws 61 at quarters thereon. The cam wheel 60 is keyed or otherwise secured to the propeller and power take-off shaft 24, and, consequently, during the turning of the rotor, the cam wheel will be operated therewith, and the anti-friction roller will travel about the cam track on said wheel and will be automatically moved in and out.

The pump cylinder 57 communicates with the fuel passageway 62. The inner end of the passageway communicates with the fuel atomizer 63, which can be of the type generally employed in Diesel engines for injecting atomized fuel in the engine cylinders.

The flow of the fuel to the atomizer from the passageway 62 is controlled by a one-way ball check valve 64, which is normally held on its seat by a spring. Also communicating with the passageway 62 is the fuel inlet line 65, which leads from a source of fuel supply, such as a storage tank. Fuel from the line is controlled by the one-way opening ball check valve 66, which is held on its seat by a spring. The pump piston 56 is normally urged toward the inner end of its cylinder by means of a relatively heavy expansion coil spring 67, and, hence, normally, the pump piston is held in the inner end of its cylinder by said spring.

The pump operates as follows. During the movement of the rotor and the cam wheel 60, the anti-friction roller 59 will follow the cam track, and when the roller rides on a cam raise or lobe, the piston will be forced outwardly against the tension of the spring, and will suck in a charge into the pump cylinder.

The suction created by the piston will tend to close the ball check valve 64 and open the ball check valve 66, so that the flow of fuel into the passageway from the line 65 will be assured.

As soon as the roller 59 rides off the cam raise or lobe, the spring 67 will function to move the piston forcibly inwardly, which places the fuel charge under pressure, and this opens the ball check valve 64 and forces the charge through the fuel atomizer 63. As the fuel atomizer 63 communicates with the inner end of the firing chamber 26, the fuel will be injected under pressure into the firing chamber.

By referring to Figure 1, it can be seen that the fuel atomizer is located adjacent the fuel pump, and that compression or sealing strips 68 are carried by the wall of the stator between the chambers 25 and 26 for surrounding the periphery of the rotor to prevent the escape of the charge from the firing chamber. Likewise, the sides of the stator can carry annular sealing rings 69, which engage the sides of the rotor. These sealing rings 69 are located in the stator at the point of connection of the side bearing plates 22 with the side walls of the stator.

Communicating with the forward ends of the chamber 26 is an exhaust passageway 70, and this passageway can be connected to an exhaust pipe.

Means can be provided for properly taking care of the lubrication of the engine, and, likewise, adequate means can be provided for cooling the engine. In the present illustration, cooling water chambers 71 can be provided in the stator adjacent the firing chamber, and suitable inlet and outlet feed water pipes are provided.

As I provide four vanes and compression pistons, there are four firing propulsions on each revolution of the rotor, and one cycle of operation of one vane and compression piston is as follows:

Considering that the rotor is turning in a clockwise direction and a vane 31 is approaching the deep end of the stator chamber 25, upon the riding of the vane into the deep end 28 of the chamber 25, air will be sucked into the primary cylinder chamber 30 through the air ports 40, 42, and 43, and the slide valve 44 at this instant will be opened by the cam lobe 51, allowing the suction of a complete air charge into the primary cylinder chamber 30. As the vane moves on, the slide valve 44 is moved to its closed position, and the air will be trapped into its primary air compression cylinder chamber 30, and as the main piston 27 is moved inwardly due to the camming action between the vane 31 and the arcuate wall of the chamber, the air will be highly compressed and will be forced into the secondary air compression cavity 33 past the check valve 35.

The vane 31 will now ride out of the chamber 25 past the compression rings 68, and the vane will then snap into the deep end of the firing chamber 26. This forcible outward movement of the vane and piston 27 will highly compress the air trapped in the secondary compression chamber or cavity 33, and this highly compressed air will be forced out of the chamber past the second valve 38 into the firing chamber 26.

At this instant, the pump 55 will be operated by the anti-friction roller 59 riding off one cam lobe 61 for forcing the fuel under pressure through the atomizer 63 into the firing chamber. The fuel under pressure and the air under pressure will commingle and a turbulence will be set up, and the charge will be immediately fired due to the existence of the highly compressed air and fuel. The firing of the charge will act against the vane 31 and the rotor will be turned. As the vane rides into the chamber 26, the previously fired charge will be swept out of the chamber 26 in advance of the vane and into the atmosphere through the exhaust passageway 70.

At this particular time, the next adjacent vane is riding into the firing chamber, and a following vane is riding into the chamber 25.

From the foregoing description it can be seen that I have provided an exceptionally simple and durable form of rotary engine, which will effectively operate under the Diesel principle.

Changes in details may be made without departing from the spirit or the scope of my invention, but what I claim as new is:

1. A rotary Diesel internal combustion engine comprising, a stator having a firing chamber therein and a chamber located in advance of the firing chamber, each of said chambers being provided with a cam face, a rotor in said stator, sliding vanes carried by the rotor movable into the chambers and adapted to be cammed into the rotor by the cam faces, spring means normally urging the vanes outward into the chambers, means operated by the vanes for compressing air in the rotor, the stator having an air inlet port, air-conducting passageways for the chambers momentarily registering with the port during movement of the rotor, slide valves carried by the rotor for controlling the opening and closing of the passageways, a stationary cam track formed on the stator, stems on the slide valves extending toward the track, and anti-friction rollers on the stems engaging the track for bringing about the opening and closing of the slide valves.

2. A rotary Diesel internal combustion engine comprising, a stator having a firing chamber therein and a chamber located in advance of the firing chamber, each of said chambers having cam surfaces, a rotor, a plurality of equidistantly spaced vanes slidably mounted in the rotor, spring means normally urging the vanes out of the rotor and into the stator chambers, the vanes being adapted to be cammed into the rotor against the tension of the springs by the cam surfaces, an air inlet port formed in the stator, an air compression cylinder chamber disposed inwardly of each vane in the rotor, a vane-operated piston disposed in each cylinder chamber, an air passageway communicating with each cylinder chamber and adapted to momentarily communicate with the air port during rotation of the rotor, a slide valve mounted in each passageway for controlling the flow of air from the passageway into the cylinder chamber, means for automatically operating the slide valves during movement of the rotor, the air being adapted to be compressed in the rotor by the pistons during movement of the vanes, means for transferring air under pressure from the cylinder chambers to the firing chamber, and means operated by the rotor for injecting fuel under pressure into the firing chamber simultaneously with the entrance of air, whereby to bring about a turbulence of the fuel and air and the firing of the chamber.

GEORGE F. PIEPER.